Figure 4:
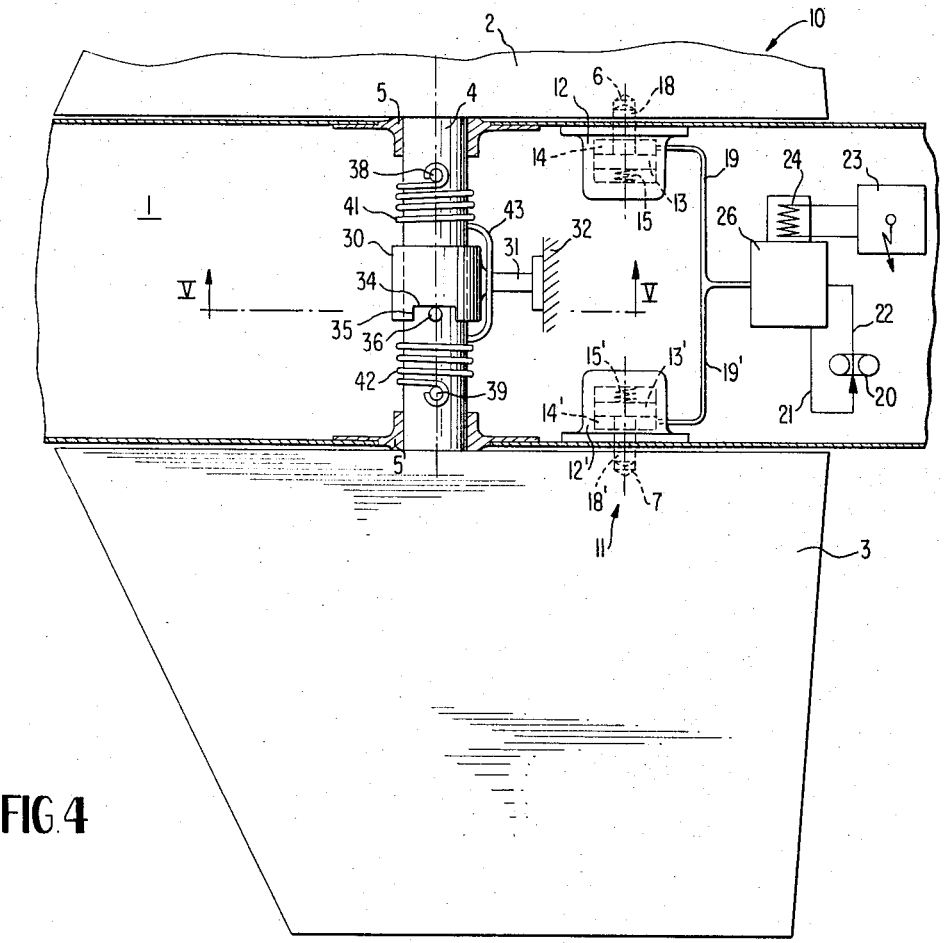

Feb. 20, 1968  E. WIELAND ETAL  3,369,780
AIRCRAFT HAVING FLEXIBLE WING SURFACES
Filed Jan. 14, 1966  3 Sheets-Sheet 1
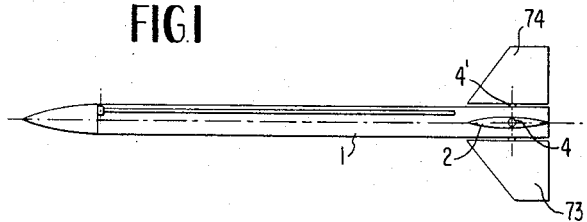
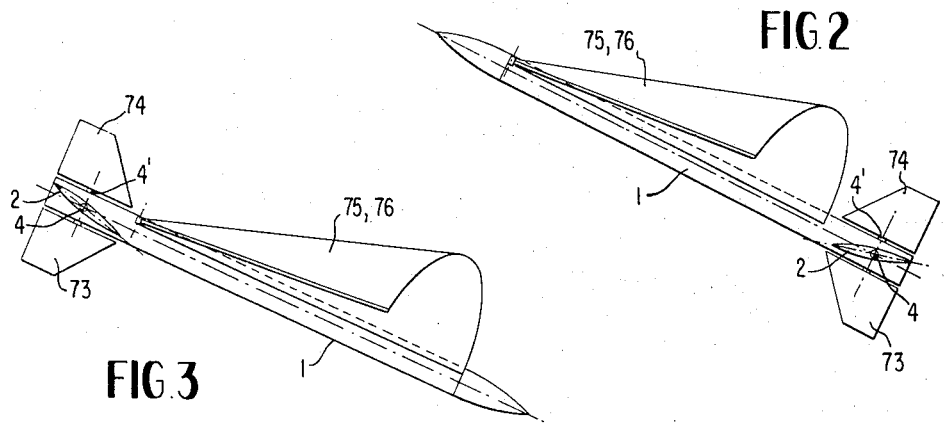
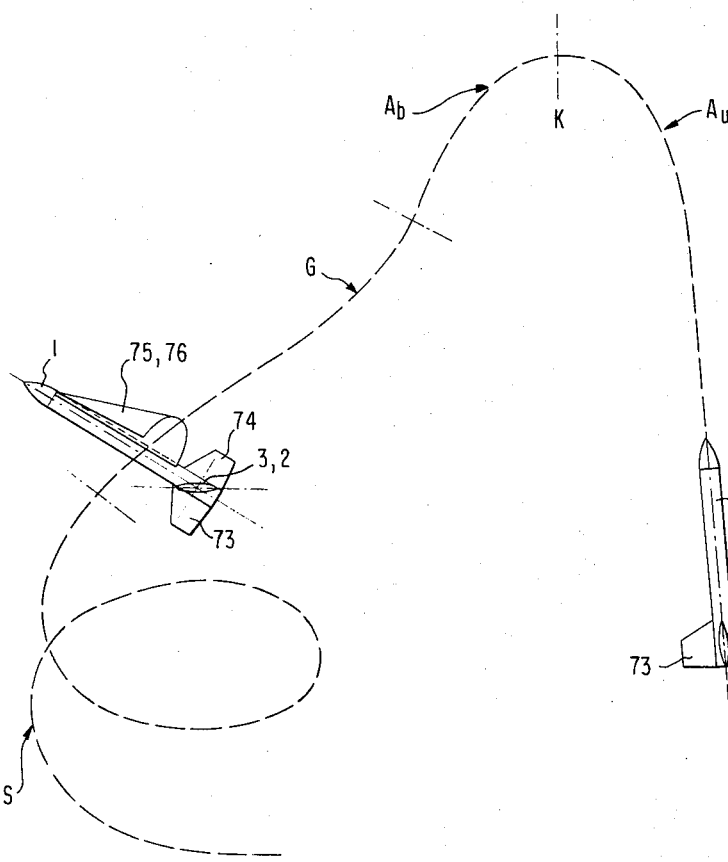
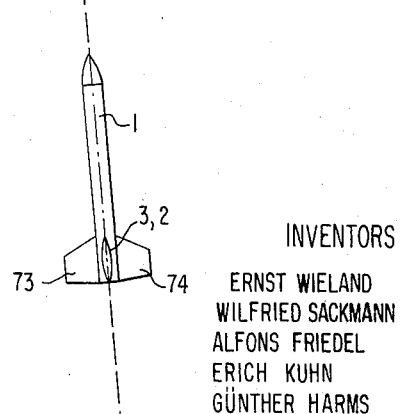
INVENTORS
ERNST WIELAND
WILFRIED SACKMANN
ALFONS FRIEDEL
ERICH KUHN
GÜNTHER HARMS
James E. Bryan
ATTORNEY Feb. 20, 1968  E. WIELAND ET AL  3,369,780
AIRCRAFT HAVING FLEXIBLE WING SURFACES
Filed Jan. 14, 1966  3 Sheets-Sheet 2

INVENTORS
ERNST WIELAND
WILFRIED SACKMANN
ALFONS FRIEDEL
ERICH KUHN
GÜNTHER HARMS

BY  *James E. Bryan*
ATTORNEY

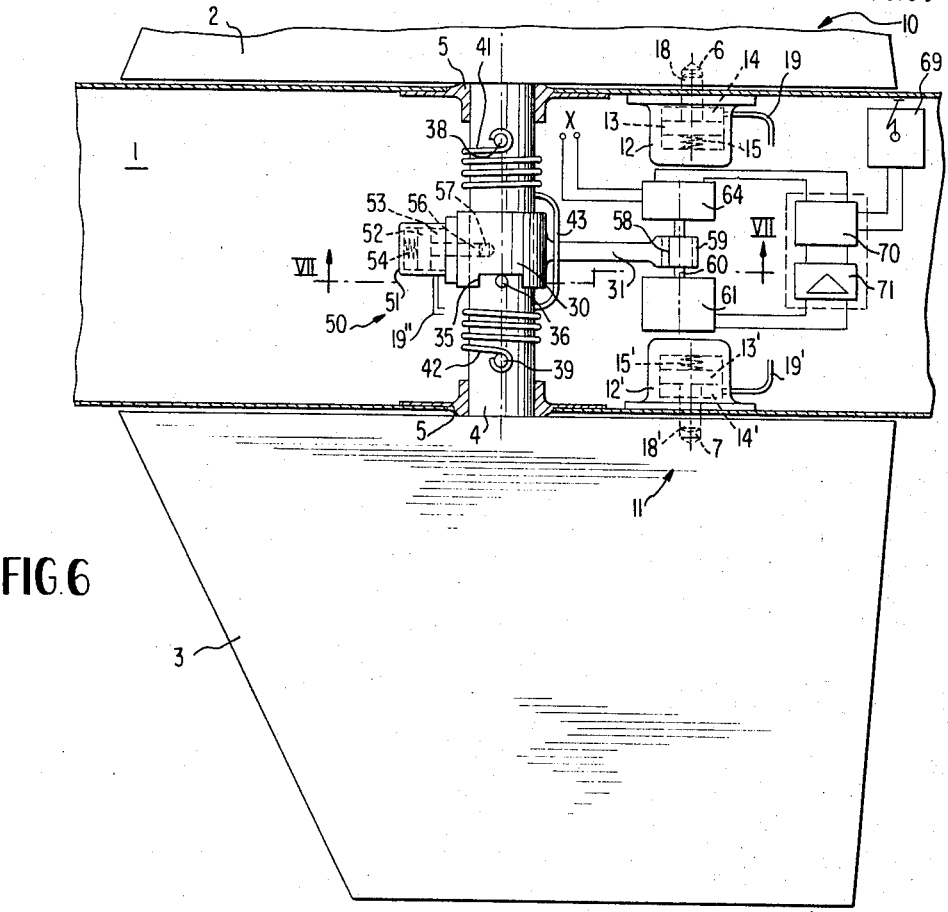

United States Patent Office 3,369,780
Patented Feb. 20, 1968

3,369,780
AIRCRAFT HAVING FLEXIBLE WING SURFACES
Ernst Wieland, Langenargen, Heckenweg, Wilfried Sackmann, Immenstaad am Kippenhorn, Alfons Friedel, Neukirch Kreis Tettnang, Erich Kuhn, Langenargen, and Gunther Harms, Friedrichshafen-Manzell, Germany, assignors to Dornier System G.m.b.H., Friedrichshafen, Germany, a limited-liability corporation of Germany
Continuation-in-part of application Ser. No. 379,400, June 30, 1964. This application Jan. 14, 1966, Ser. No. 520,740
Claims priority, application Germany, July 5, 1963, D 41,910
12 Claims. (Cl. 244—87)

This application is a continuation-in-part of copending application Ser. No. 379,400, filed June 30, 1964, now U.S. Patent No. 3,279,723, granted Oct. 18, 1966.

This invention relates to an aircraft having flexible wing surfaces which are adapted to be extended and retracted and having stabilizing fins or surfaces mounted on the aircraft. Such aircraft are known under the names of "paraglider" and also "flex-wing." In these aircraft the wing surfaces consist of flexible coverings extending between a central longitudinal keel and lateral spars attached to the keel whereby the spars assume, in the extended condition of the flexible wing surfaces, an arrow-like configuration. The nacelle or fuselage of the aircraft generally is mounted below the flexible airfoils in order to attain a high inherent stability of the aircraft as a result of a low center of gravity.

One of the problems encountered in paraglider aircraft is the steering or control and stabilization thereof. It is known to steer such an aircraft by means of a displacement of the center of gravity thereof either towards the front or rear with respect to the aerodynamic center or pressure point of the aircraft, and to thus effect a change in the angle of incidence. A lateral movement or shifing of the center of gravity results, on the other hand, in a change in the aircraft flight direction.

This known type of steering is imperfect, however, and, in particular, the response thereof is extremely slow since relatively large forces must be employed for shifting the center of gravity. In paragliders wherein the central longitudinal keel member simultaneously constitutes the nacelle or fuselage of the aircraft, the center of gravity is positioned very closely to the aerodynamic pressure point or center and a control of the aircraft by means of a displacement or shifting of the center of gravity is impossible.

For the purpose of improving the altitude control of paraglider aircraft it already has been proposed to use a horizontal tail assembly mounted in the slip stream of a pulling propeller. This horizontal tail assembly influences the propeller slip stream in a manner such that it impinges from below upon the rearward portion of the wing surface and, thus, effects at that point an additional moment about the transverse axis of the aircraft.

A further problem encountered in paraglider aircraft having flexible wing surfaces adapted to be extended and retracted resides in the stabilization thereof. The stabilization of manned and unmanned paraglider aircraft heretofore has been attempted by employing a low center of gravity. This method of stabilization is, however, feasible only in aircraft of limited maneuverability and having a restricted range of flying speeds. In addition, the wing surfaces have a relatively great angle of incidence and the stabilizing fins have a setting angle or angle of adjustment which is coordinated either to the flight phase of the aircraft when the wing surfaces are retracted or to the flight phase thereof when the wing surfaces are extended.

The present invention relates to an aircraft having flexible wing surfaces, which are adapted to be extended and retracted, and being provided with improved steering or control and stabilization means. The invention more particularly relates to aircraft which operate in two different flight phases, i.e., in a flight phase with retracted flexible wing surfaces and a flight phase in which the flexible wing surfaces are extended. This would be the case, for example, in a rocket body in which the flexible wing surfaces are retracted in the ascending phase of flight and are extended at the beginning of the gliding phase, after passing the point of maximum altitude.

In the aircraft of the present invention, the fins serving as stabilizers for the flight phase in which the flexible wing surfaces are retracted are adapted to be unlocked either during or after the extension of the flexible wing surfaces and may be operated as aerodynamic rudders.

Also in the aircraft of the present invention, the fins which are releasable either during or after the extension of the flexible wing surfaces are adapted to be automatically adjusted to a new position or setting angle or angle of adjustment which is coordinated to the flying characteristics of the aircraft.

In a further embodiment of the present invention, the fins are pivotal from the new position of the setting angle thereof for the purpose of steering the aircraft in one or the other direction. The setting angle or angle of adjustment is understood, as is known, as the angle between the wing chord of the altitude-stabilizing fins of the aircraft and the horizontal when the aircraft is in the rigging position. The horizontal line in the embodiment illustrated in the drawings coincides with the longitudinal axis of the aircraft. The angle of incidence, on the other hand, is understood, as is known, as the angle between the chord, or the symmetrical line of the stabilizing fins, and the direction of airflow.

As a result of the foregoing construction, the stabilizing fins simultaneously may be used for steering the aircraft. Furthermore, the stabilizing fins, after being unlocked, may be adjusted to a setting angle which corresponds to the relatively great angle of incidence of the aircraft having flexible wing surfaces in such a manner that, after the angular adjustment of the fins, the latter will again serve to stabilize the aircraft. The aircraft is guided by the stabilizing surfaces into the position most favorable for flight and the change of the setting angle of the fins prior to or simultaneously with the opening operation of the flexible wing surfaces provides for a reliable unfolding of the flexible wing surfaces under the relatively great angle of incidence required.

The invention will be further illustrated by reference to the accompanying drawings in which—

Figure 5:
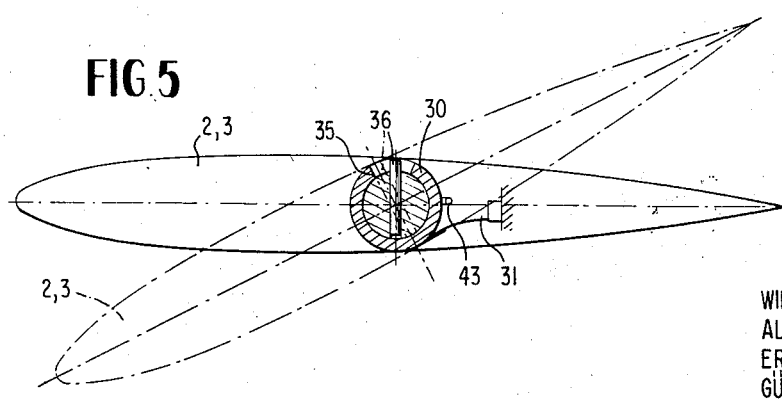

FIGURE 1 is a plan view of an aircraft having flexible wing surfaces which are adapted to be extended and retracted, the wing surfaces being shown in the retracted position, FIGURE 2 is a side view of the aircraft of FIGURE 1 with the wing surfaces in the extended position, FIGURE 3 is a further embodiment of the aircraft having extended flexible wing surfaces, FIGURE 4 is a fragmentary view in cross-section of a portion of the aircraft of FIGURE 1 showing the mounting of the stabilizing fins, FIGURE 5 is a view in cross-section taken on line V—V of FIGURE 4, showing the mounting of the fins on the aircraft, the position of the fins when the flexible wing surfaces are retracted being indicated in solid lines and the position of the fins when the flexible wing surfaces are extended being illustrated in phantom, FIGURE 6 is a fragmentary view in cross-section of a further embodiment of the apparatus employed to adjust the angle of the fins, the fins in this embodiment being adapted to be adjusted through an angular range for the purpose of steering, FIGURE 7 is a view in cross-section taken on line VII—VII of FIGURE 6 illustrating different positions of the fins shown in FIGURE 6, and FIGURE 8 illustrates the aircraft in the ascending flight phase and then in the descending flight phase thereof showing different positions of the stabilizing fins.

Referring to FIGURE 1, a rocket 1 is equipped with extendable flexible airfoil surfaces 75 and 76 which are used in the recovery operation. The flexible supporting surfaces are accommodated lengthwise in the rocket body and are covered by the leading edges of the wing, the latter being so mounted and constructed with respect to the external covering or skin of the rocket that they form a component thereof in the retracted position and do not produce an additional aerodynamic resistance. They simultaneously may serve as a heat shield for the flexible covering positioned in the rocket body and, thus, may replace the heretofore used covering means.

FIGURE 2 shows the aircraft of FIGURE 1 during the return or recovery phase with the flexible supporting surfaces in the extended position, these surfaces being mounted forward of the control and stabilizing surfaces 2, 3, 73, and 74, in the direction of flight. The aerodynamic stabilizing fins 2, 3, 73 and 74 utilized in the ascending phase of the rocket flight aren ot rigidly connected with the rocket 1 in the conventional manner but are instead, mounted to pivot about the axes 4 and 4' so that they may be employed as rudder surfaces during the return or recovery phase of the flight. During the ascending phase of the flight, the fins are locked in position with respect to the body of the rocket 1 whereas they are released for purposes of steering and control in the return or recovery phase of the flight. This release occurs, in most instances, simultaneously with the extension of the paraglider wings. The stabilizing surfaces 2 and 3, which serve as horizontal stabilizers during the return or recovery phase of the flight, will automatically assume a predetermined angle of incidence after release, which angle is coordinated with respect to the flight characteristics of th aircraft. This specific angle of incidence of the stabilizing surfaces is necessary so that the aircraft will assume the position most favorable for flight. The position of the horizontal tail unit, shown in FIGURE 2 is, thus, the zero position thereof.

The present invention also may be utilized in various modifications thereof. It is not necessary that the tail planes shown in the embodiment of FIGURES 1 and 2 be mounted at the rear of the aircraft and, instead, such planes may be mounted on the forward portion thereof, as shown in the embodiment of FIGURE 3. In this case, the control and stabilizing surfaces 2, 3, 73, and 74 are positioned forwardly of the extended flexible supporting surfaces in contrast to the embodiments of FIGURES 1 and 2.

Referring to FIGURES 4 and 5, the portion of the rocket body on which the stabilizing fins are mounted is shown. The stabilizing fins are mounted to be pivotal in two positions which are different with respect to each other, one position being coordinated to the ascending flight phase while the second position is coordinated to the descending flight phase of the rocket body. In the ascending flight phase, the wing chord of the stabilizing fins is parallel to the longitudinal axis of the aircraft whereas in the descending flight phase with the flexible wing surfaces being extended and serving as the primary wing assembly, the fins assume a setting angle or angle of adjustment which is coordinated to the flight characteristics of the paraglider so as to effect the most favorable flying attitude of the rocket body during the descending flight phase.

The apparatus required is accommodated within the rocket body 1 which is to be returned to the ground. The stabilizing fins 2 and 3 are mounted on opposite sides of the rocket body and are secured to a pivot shaft 4 which is rotatably mounted within the rocket body; the pivot shaft 4 rotates in the bearings 5. The stabilizing fins 2 and 3 each has a recess 6 and 7, respectively, therein and a locking mechanism 10 and 11, respectively, has a portion adapted to engage in each of the respective recesses. The locking mechanisms are composed of a housing 12 and 12', respectively, an operating piston 13 and 13', respectively, adapted to be actuated by a pressure medium, a cylindrical space 14 and 14', respectively, formed within the housings 12 and 12', respectively, and compression springs 15 and 15', respectively, which serve to bias the pistons 13 and 13', respectively toward the locking position. A locking pin 18 and 18', respectively, which is adapted to engage in the recesses 6 and 7, respectively, in the stabilizing fins is secured to the pistons 13 and 13', respectively, and engages, when the flexible wing surfaces are in the retracted position, in the recesses 6 and 7, respectively, of the stabilizing fins thus preventing a rotation of these fins, about the pivot shaft 4, with respect to the rocket body. In this position, the wing chord of the stabilizing fins is parallel to the longitudinal axis of the rocket body 1. Branch lines 19 and 19', respectively, connected to a pressure medium control or regulating device 26 by means of a common conduit, terminate in the cylindrical spaces 14 and 14', respectively. A pressure medium supply pump 20 conveys pressure medium, through the pressure line 22, to the pressure medium control device 26. The pump 20 draws pressure medium from the pressure medium control and from a pressure medium reservoir through the line 21. An electric switch 24 is connected to the pressure medium control device 26, which latter is of conventional construction, and the switch 24 is actuated by a receiver 23, the latter obtaining switching impulses from a transmitter on the ground.

A sleeve 30 is freely rotatably mounted on the pivot shaft 4 and includes an arm 31, which latter is supported on an abutment 32 in the rocket body 1. At the end face thereof, the sleeve 30 is provided with a recess 34 having an abutment surface 35 which is in operative engagement with a stop or trip pin 36 rigidly mounted in the pivot shaft 4. Mounted around the pivot shaft 4 is, at both sides of the sleeve 30, a helical element 41 and 42, respectively, of a spring, the connecting bracket 43 of which is supported against the arm 31 of the sleeve 30. The ends of both helical spring parts 41 and 42, respectively, are secured around the pins 38 and 39, respectively, which latter are rigidly inserted in bores in the pivot shaft 4. The helical spring parts 41 and 42, respectively, are under a certain pre-stress in the illustrated position of the stabilizing fins and bias the pivot shaft 4, together with the stabilizing fins secured thereto, in a counter-clockwise direction.

The operation of the embodiment of FIGURES 4 and 5 is as follows: When the flexible airfoils are in the retracted position thereof, for example during the ascending flight phase of the rocket, the two stabilizing fins 2 and 3 are in the position shown in FIGURE 4 in which the locking pins 18 and 18', respectively, engage in the corresponding recesses 6 and 7, respectively, in the fins. The stabilizing fins 2 and 3 thereby assume a position which is shown in solid lines in FIGURE 5. The chord line of the fins is then parallel to the longitudinal axis of the rocket. In this flight phase, the spring 41, 42, 43 cannot operate to alter the angle of the fins. When the rocket 1 has passed beyond the point of maximum altitude, i.e., when it passes over into the descending flight phase, the flexible wing surfaces are extended from the rocket. Together with this extension of the flexible wing surfaces, or a short time ago, the locking mechanisms 10 and 11 are actuated in order to release the fins 2 and 3. A pulse is sent from a transmitter on the ground to the receiver 23 which latter, in turn, causes the switch 24 to operate. Pressure medium conveyed from the pressure medium supply pump 20 to the pressure medium control device 26 through the line 22 is then no longer conveyed to the return line 21 but into the cylindrical spaces 14 and 14', respectively, of the locking mechanisms 10 and 11. The pistons 13 and 13' are displaced against the action of the springs 15 and 15', respectively, and the locking pins 18 and 18' connected to the pistons 13 and 13' are withdrawn from the recesses 6 and 7 in the stabilizing fins 2 and 3. As a result of this unlocking action, the pre-stressed spring 41, 42, which, on the one hand, abuts against the arm 31 and, on the other hand, acts on the pivot shaft 4, causes the shaft 4 and the fins 2 and 3 secured thereto to be rotated in a counterclockwise direction until the stop pin 36 abuts against the surface 35 of the sleeve 30. After abutment of the pin 36, the shifting operation of the fins 2 and 3 is completed. The fins have thus assumed a new position, as shown in phantom in FIGURE 5. Also, after abutment of the pin 36 against the abutment surface 35, the force exerted by the spring 41, 42 is not exhausted and the fins 2 and 3 are retained in the new position, by means of the spring tension, against the airflow force acting on the fins. The new setting angle or angle of adjustment of the fins 2 and 3 is coordinated to the relatively great angle of incidence of the extended flexible wing surfaces and effects a reliable opening of the flexible wing surfaces as well as a stabilization of the aircraft at optimum flying properties in the descending phase of the rocket.

The unfolding of the flexible wing surfaces may be facilitated if the rotation of the stabilizing fins 2 and 3 is effected a short time prior to the unfolding of the wing surfaces. The aircraft 1 will thereby assume a position in which the angle of incidence approximates the angle of incidence when the wing surfaces are extended. Thus, the flying position for the descending phase is rapidly assumed and the unfolding shocks during the extension of the flexible wing surfaces are diminished.

FIGURES 6 and 7 illustrate a further embodiment of the mounting of the stabilizing fins. In this embodiment, the fins 2 and 3 are pivoted, in a manner analogous to that of FIGURES 4 and 5, from a locked position into a new position which encloses a setting angle or angle of adjustment of the fins 2 and 3, with respect to the rocket, which is different from the original position. In distinction to the embodiment of FIGURES 4 and 5, the stabilizing fins 2 and 3 are mounted in a manner so that they are adjustable from the new setting angle position thereof with respect to the rocket body. Due to this adjustment, the possibility exists to have the fins 2 and 3 act as aerodynamic rudders in order to make a correction and to control the flight path of the rocket.

In this embodiment, the fins 2 and 3 are also rigidly mounted on the pivot shaft 4 and the rocket body contains the locking mechanisms 10 and 11 including the housings 12 and 12', the pistons 13 and 13', the cylindrical spaces 14 and 14', and the compression springs 15 and 15', respectively. Rigidly connected to the pistons are the locking pins 18 and 18', respectively, which can engage in the corresponding recesses 6 and 7, respectively, in the fins 2 and 3. The cylinder spaces 14 and 14' are in communication, in this embodiment also, with the pressure medium control 26 by means of the lines 19 and 19', respectively, the pressure medium control being actuated by the switch 24, which latter obtains switching impulses from the receiver 23. The pressure medium control 26, the switch 24, and the pressure medium supply pump 20 are constructed in this embodiment in the same manner as in the embodiment of FIGURES 4 and 5, therefore, have not been illustrated in FIGURE 6.

Freely rotatably mounted on the pivot shaft 4 is a sleeve 30 which includes a recess having an abutment surface 35. A stop pin 36 is mounted in the pivot shaft 4 and cooperates with the abutment surface 35. The sleeve 30 includes an arm 31, the free end of which has a toothed segment 58 thereon. Rigidly mounted in the pivot shaft 4 are the pins 38 and 39, respectively, about which are positioned the ends of a spring being under an initial stress or load. The spring device consists of a spring having the helical portions 41, 42 as well as the spring connecting bracket 43 which connects the two helical spring parts and is supported against the arm 31 of the sleeve 30. An additional locking mechanism 50 is secured to the sleeve 30 and comprises a housing 51, a movable piston 52 therein, and a cylinder space 53 formed within the housing 51 as well as a pre-stressed compression spring 54 acting on the piston. The cylinder space 53 is in communication with the pressure medium control 26 by means of the line 19" in the same manner as the lines 19 and 19' of the locking mechanisms 10 and 11. Secured to the piston 52 is a locking pin 56 which can engage in a recess 57 in the pivot shaft 4. The toothed segment 58 is in constant engagement with a pinion 59, which latter is keyed to a shaft 60. The shaft 60 is the motor or main shaft or a servomotor 61 and carries at the free end thereof the secondary element of a potentiometer 64. The primary element of the potentiometer is mounted concentrically to the secondary element and is connected to a synchronous receiver 70 serving as a comparator. The synchronous receiver, in turn, is adjacent an amplifier 71 which is connected to the servomotor 61. The synchronous receiver 70 is actuated, through connecting electric lines, by a receiver 69 which obtains impulses from a transmitting station on the ground. Permanently connected to the primary element of the potentiometer 64 is an energy or current source X.

The operation of this embodiment is as follows: In the positions shown in FIGURES 6 and 7, the fins 2 and 3 are locked, by means of the locking mechanisms 10 and 11, in a position which corresponds to the position the fins occupy during the ascending flight phase of the rocket, the chord line of the fins 2 and 3 being parallel to the longitudinal axis of the rocket; the fins act as stabilizers in this flight phase. When the rocket has passed through the point of maximum altitude and when the flexible wing surfaces are then extended for the return of the rocket to the ground, the locking pins 18 and 18', respectively, are withdrawn from the recesses in the fins 2 and 3, upon the command of the transmitting station and the receiving station 23 so that pressure medium is simultaneously supplied to the cylinder spaces 14 and 14' by means of the lines 19 and 19', and the pistons 13 and 13' are displaced against the action of the springs 15 and 15', respectively. At the same time, or shortly thereafter, the locking mechanism 50 is also actuated by means of the pressure medium control device 26 shown in FIGURE 4 and pressure medium is supplied to the pressure cylinder space 53 through the line 19". The piston 52, together with the locking pin 56, is displaced against the action of the compression spring 54 and the locking pin 56 is withdrawn from the recess 57 in the pivot shaft 4. The spring 41, 42 then becomes operative and pivots the shaft 4 counterclockwise until the pin 36 abuts against the abutment surface 35 on the sleeve 30. Since, on the one hand, the spring is supported by means of the bracket 43 against the arm 31 of the sleeve 30 and the pin 36 acts in the opposite direction by means of the abutment surface 35 on the sleeve 30, the force of the spring 41, 42 is now counteracted. Due to the pivoting movement of the shaft 4, the fins 2 and 3 rigidly connected thereto are pivoted into a new setting angle or position. This new position corresponds to the position of the fins 2 and 3 indicated in phantom in FIGURE 7. The movement of the stabilizing fins 2 and 3 should here again take place, as described above, either simultaneously with or a short time prior to the extension of the flexible wing surfaces. As a result of the new setting angle or angle of adjustment of the fins 2 and 3, the rocket body 1 is stabilized in an optimum position for flight in accordance with the large angle of incidence of the extended flexible wing surfaces.

In order to effect control and to effect deviations from this new setting angle position of the fins 2 and 3, a corresponding impulse is given to the receiver 69 in the rocket body 1 by a transmitting station on the ground. In the comparing device 70, a voltage is thus produced which supplies a shifting impulse to the servomotor 61 by means of the amplifier 71. The servomotor then rotates the toothed segment 58, by means of the pinion 59, and the pivot shaft 4, together with the fins 2 and 3 in one or the other direction. This pivoting corresponds to a steering or correction of the flying position of the rocket about the transverse axis thereof. Due to the rotation of the shaft 60 and the rotation of the secondary element of the potentiometer with respect to the stationary primary element, a voltage is produced in accordance with the angular displacement of the potentiometer members with respect to each other, which voltage is compared with the voltage supplied to the comparator 70 by the transmitting impulse. A change of the control impulse, and if desired also an interruption thereof, effects a coordinated new voltage in the comparing device 70. This built-up voltage is then again compared with the value set by the potentiometer 64 in accordance with the original angular displacement and the difference is converted into a new command, if desired a resetting command, and is transmitted by means of the amplifier 71 to the servomotor so that the stabilizing fins are returned to the initial position thereof by means of the rack and pinion drive 58, 59, the lever 31 and the sleeve 30, the initial or starting position being here understood as the new setting angle position indicated in phantom in FIGURE 4. Using the potentiometer 64 and the comparator 70, this new setting angle position of the stabilizing fins 2 and 3 is thus predetermined. A displacement of the stabilizing fins 2 and 3 for steering the rocket body is initiated by corresponding switching impulses from the transmitting and receiving stations described above and is effected by the servomotor 61.

The invention is not limited to the embodiments shown and described herein but, instead, it is also possible, for example, to pivot the stabilizing fins 2 and 3 by means of a transmitting and receiving station and corresponding transmission members without the spring device or mechanism 41, 42 illustrated.

FIGURE 8 schematically illustrates the various flight phases of the rocket body. The rocket is shown during the ascending phase $A_u$ thereof in which phase the stabilizing fins 2 and 3 are positioned with the chord thereof parallel to the longitudinal axis of the rocket. During the ascending phase, the flexible wing surfaces are retracted into the rocket body 1. After the point of maximum altitude K has been passed, the descending phase $A_b$ begins, which becomes the gliding phase within the range G. The transition of the gliding phase G coincides with the extension of the flexible wing surfaces 75 and 76 of the rocket 1 and with the pivoting of the stabilizing fins 2 and 3 into the new setting angle position, which corresponds to the relatively great angle of incidence of the flexible supporting wings of the rocket. In this position of the rocket with the extended flexible wing surfaces 75 and 76, the stabilizing fins 2 and 3 can be used as aerodynamic rudders from the new setting angle position and may effect a correction of the flying path of the rocket.

The stabilizing fins 73 and 74 also may be utilized as aerodynamic rudders and for this purpose it is also necessary to provide means, not shown, which include a receiving station, a servomotor, and corresponding electrical members. The rocket 1 then may be brought down to the ground in a helical descending path S to a predetermined touchdown point.

It will be obvious to those skilled in the art that many modifications may be made within the scope of the present invention without departing from the spirit thereof, and the invention includes all such modifications.

What is claimed is:

1. An aircraft comprising a keel, flexible and foldable wing surfaces secured to the keel and to leading edges adapted to form an acute angle with the keel, at least one non-foldable aerodynamic control and stabilizing surface mounted on the keel, and means for varying the angle between the control surface and the keel.

2. An aircraft according to claim 1 in which the control surface comprises a pair of fins.

3. An aircraft according to claim 2 in which the fins are mounted on a shaft passing through the keel.

4. An aircraft according to claim 2 in which the means for varying the angle between the control surface and the keel includes spring means.

5. An aircraft according to claim 2 in which the means for varying the angle between the control surface and the keel includes spring means and gear means.

6. An aircraft according to claim 2 including locking means mounted in the keel and adapted to extend into the fins.

7. An aircraft according to claim 5 including servomotor means connected to the gear means.

8. An aircraft according to claim 7 including electrical comparing means connected to the servomotor means.

9. An aircraft according to claim 2 in which the fins are part of a tail assembly.

10. An aircraft according to claim 2 in which the fins are mounted on the keel as a canard.

11. An aircraft according to claim 1 including means for fixing a first setting of the aerodynamic control and stabilizing surface with regard to the keel and means for displacing said surface into a second setting which is different from said first setting.

12. An aircraft according to claim 11 including means for displacing the control and stabilizing surface about the second setting for purposes of controlling the aircraft.

References Cited

UNITED STATES PATENTS

| 3,090,580 | 5/1963 | Kehlet et al. | 244—87 |
| 3,223,361 | 12/1965 | Girard | 244—87 |
| 3,194,514 | 7/1965 | Rogallo | 244—49 |

FOREIGN PATENTS 512,619  3/1938  Great Britain.

ANDREW H. FARRELL, *Primary Examiner.*

FERGUS S. MIDDLETON, *Examiner.*